United States Patent [19]

Brandon

[11] Patent Number: 5,111,663

[45] Date of Patent: May 12, 1992

[54] TURBINE START-UP PARTICULATE SEPARATOR

[76] Inventor: Ronald E. Brandon, 1734 Lenox Rd., Schenectady, N.Y. 12308

[21] Appl. No.: 790,447

[22] Filed: Nov. 12, 1991

[51] Int. Cl.⁵ ............................................. F01K 13/02
[52] U.S. Cl. ........................................ 60/656; 60/657
[58] Field of Search ..................... 60/656, 646, 657

[56] References Cited

U.S. PATENT DOCUMENTS 4,367,628  1/1983  Mangus ........................ 60/646 X
4,683,722  8/1987  Ewbank et al. ................. 60/656

Primary Examiner—Allen M. Ostrager
Attorney, Agent, or Firm—Ross, Ross & Flavin

[57] ABSTRACT

Start-up particulate separating apparatus for the inlet steam flow to a steam turbine, where particulate material can be a cause of internal damage and erosion, comprising a steam inlet pipe to the turbine, a centrifugal separator, and means for directing the inlet steam from the inlet pipe to the separator for removing particulate therefrom.

11 Claims, 3 Drawing Sheets

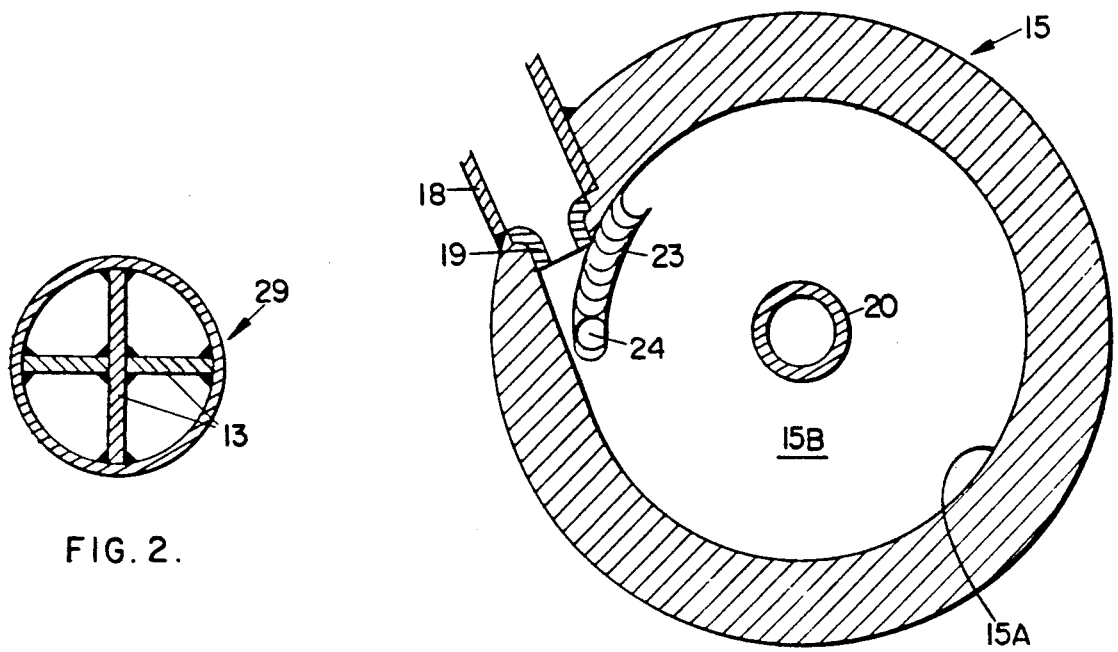
FIG. 2.
FIG. 3.
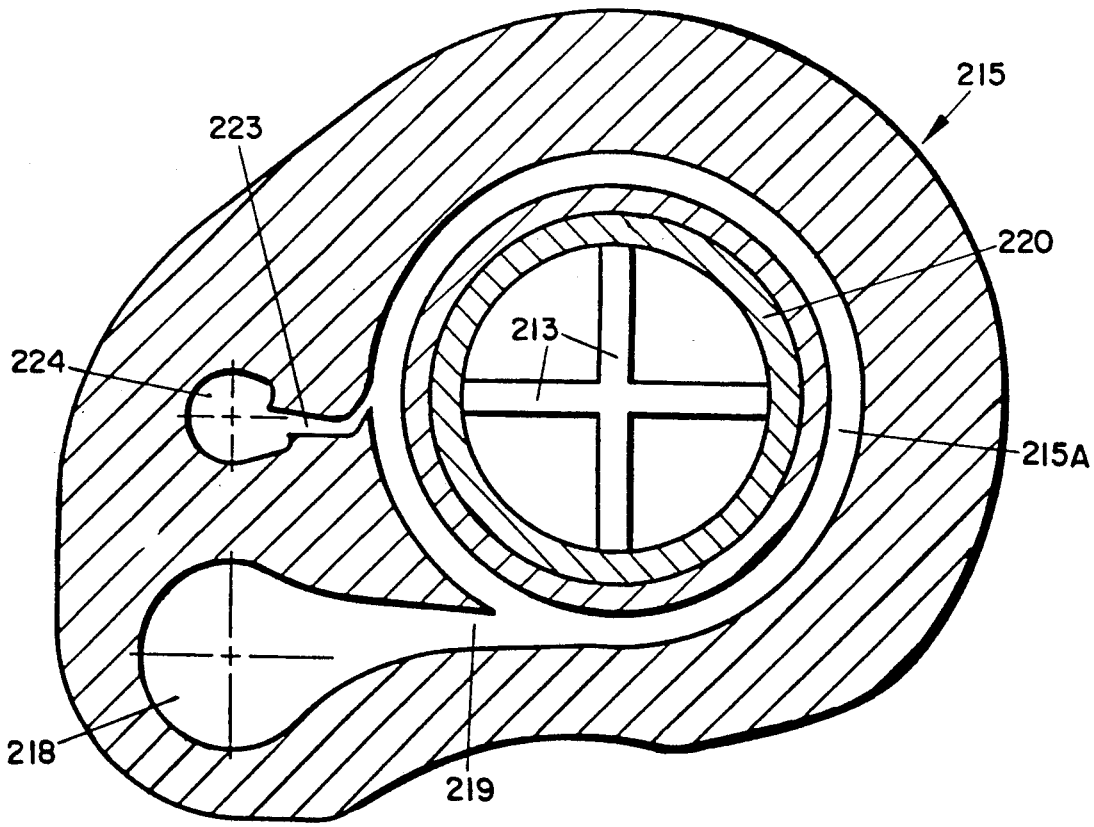
FIG. 6.

TURBINE START-UP PARTICULATE SEPARATOR

BACKGROUND OF THE INVENTION

1. Field of the Invention

The invention relates to the separation or removal of particulate material carried by steam from a turbine boiler.

2. Description of the Related Art

A persistent and costly problem for steam turbines is the particulate material carried by the steam from the boiler. This material, either hard particles or oxide layers that spall off the hot pipes can erode and damage the internal turbine components including, for example, nozzles, buckets, tenons and tip seas.

A variety of efforts have been made to separate such particulate from the steam prior to its entry into the turbine. Such systems include centrifugal separation and other methods that take advantage of the density differences between the steam and the heavier particles. Such systems have had limited success, since effective separation requires a larger steam pressure drop than can be economically permitted for continuous operation since pressure drop causes reduced cycle efficiency.

Additional methods take advantage of the particle inertia, trying to scoop the particulate from the steam at the outside of a turn, for example. The presence of fluid turbulence in the steam and whirl caused by pipe turns make this difficult, since the effective density difference between the steam and the flakes of material is not great. Magnetic systems that help attract particles to the pipe side walls have also been proposed.

Another method for particulate separation would be to provide a 50% bypass system that fully bypasses the turbine. Such a method should be effective. It would be used during start-ups until essentially all particulate has been blown from the boiler. This system would be expensive and difficult to achieve, requiring large, high temperature and pressure pipes and valves from the throttle to cold reheat and from hot reheat to condenser. Heat losses will also be much higher than desired.

It has been observed that the particulate material is not equally present at all times It tends to show up during re-start periods, especially cold restarts. Measurements have shown that at less than 50% of full load steam flow, the great majority of particulate materials will exit the boiler in about a 24 hour period.

SUMMARY OF THE INVENTION

It is the purpose of this invention to provide a startup bypass system with about 50% full load steam flow capacity to centrifugally separate and remove particulate material from the steam at both or either of the main steam and reheat steam inlets. The system will require a much greater pressure drop than could be permitted during steady state operation in order to achieve particulate collection. When the startup has been continued to the point where the great majority of particulates have been removed, the bypass system will then be shut off while the normal flow path is reestablished.

It should be noted that only a small part of the bypassed steam will be dumped, along with the collected particulate material. The great majority of the steam will pass through the turbine stages.

BRIEF DESCRIPTION OF THE DRAWING

FIG. 2 is a cross-sectional view taken on line 2—2 of FIG. 1;

FIG. 3 is a cross-sectional view taken on line 3—3 of FIG. 1;

FIG. 6 is a plan sectional view illustrating an arrangement using a rectangular nozzle in lieu of a round nozzle at the separator entrance.

DESCRIPTION OF THE PREFERRED EMBODIMENTS

Figure 1:
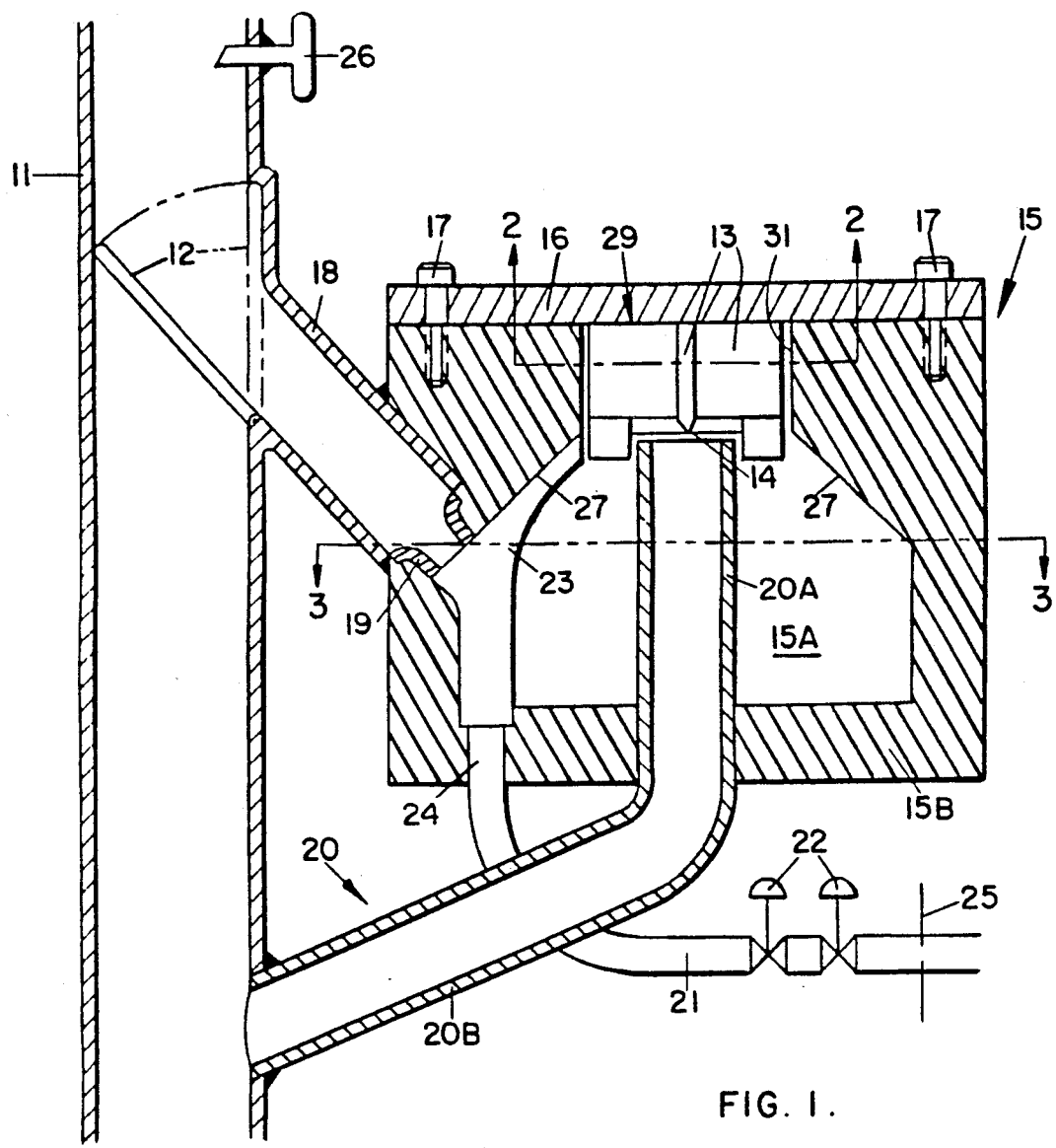
FIG. 1 is a side elevational view, partly in cross-section, of a particulate separator embodying a preferred form of the invention.

FIG. 1 is a cross section of a turbine steam pipe 11 into which the invention has been added. Steam flow is from top to bottom. Steam pipe 1 can be for the passage of high pressure or reheat pressure steam from a boiler to a turbine, neither of which is shown. A two-position flapper valve 2 is provided in pipe 11 to direct flow either into a by-pass pipe 8 connected at one end to pipe 11, as shown, or into the continuation of pipe 11, leading to the turbine. By-pass pipe 18 is connected at its opposite end to a centrifugal separator 15.

In the bypass or start-up mode, valve 12 is positioned as shown in solid lines and steam is directed into by-pass pipe 18, then into a cavity 15A of centrifugal separator 15. The entrance to separator cavity 15A is constructed to inject the steam at high velocity, tangential to the cavity surface. The high velocity is achieved by means of a high pressure inlet nozzle 19 disposed at the inner end of pipe 18 and leading into the separator cavity. The nozzle can also provide a small downward component of velocity to help separate the particulate.

A particulate counter 26 can be installed in steam pipe 11, to determine the presence of particulate in the steam and to provide an operating signal to suggest whether the separator is needed.

A steam discharge pipe 20 connects between separator 15 and steam pipe 11 and includes an upright portion 20A which passes centrally through a provided opening in lower wall 15B of separator 15 into an inclined portion 20B which leads from separator lower wall 15B to steam pipe 11 where it joins with the steam pipe at a point below the junction of by-pass pipe 18 and the steam pipe.

As the steam swirls in separator cavity 15A, the particulate is centrifuged to the outer circumference thereof and is directed into a vertical scoop 23 positioned in the separator cavity. By a combination of gravity and momentum, the particulate is directed into a hole 24 at the bottom of the scoop, then into a drain pipe 21 connected at one end to hole 24 and at its opposite end to a drain extension orifice 25 which leads either to a condenser, not shown, or to another suitable dump, also not shown. Valves 22 are provided in pipe 21 to permit safe shut off on the drain system when it is not required.

Scoop 23 is preferably arranged to have a circumferential tilt, as shown in FIG. 3, to help deflect particulate into hole 24.

As the whirling steam flows vertically upwardly within separator cavity 15A, the tapered upper walls 27 of the cavity provide a smaller diameter to cause an increased tangential velocity, further improving the separation of the particulate material by centrifugal effects.

A flow straightener 29 is disposed in a central upper opening 31 of separator cavity 15A adjacent the upper or entrance end of upper portion 20A of steam discharge pipe 20.

The flow straightener includes a pair of vertical plates 13 secured to each other and arranged at 90 degrees to each other.

Flow straightener 29 and plates 13 act to remove most of the steam whirl so as to minimize the pressure drop of the bypass system and to reduce the magnitude of the time-varying flow in the downstream components.

Separator 15 includes a top access flange 16 secured thereto by bolts 17.

Drain extension orifice 25 is sized to pass and be capable of measuring a selected amount of flow, such as 2% of a full load flow into drain pipe 21.

In practice, during any start-up where particulate flow is expected, valve 12 would be positioned in the solid line position to shut off normal flow through pipe 11 and detour the flow into bypass pipe 18 and through separator 15. Valves 22 would be open.

Figure 5:
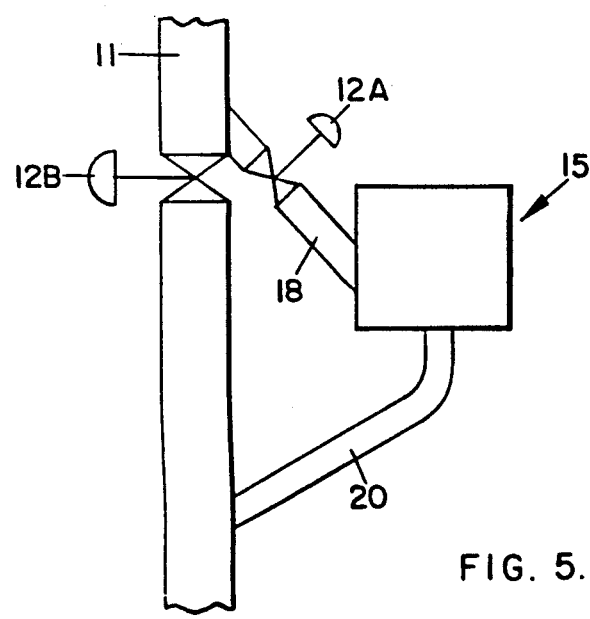
FIG. 5 is a front elevational schematic view of a modified two-valve arrangement.

It should be noted that two valves could be used as shown in FIG. 5 in lieu of the two position flapper valve 12: one valve 12a disposed in bypass pipe 18 to open or close the bypass pipe and the other valve 12B disposed in steam pipe 11 to open or close the steam pipe. Shut-off valve 12B should be selected and located to minimize any storage of particulate material.

Any stagnant volumes should be minimized that would allow accumulation of particulate material that could enter the turbine when the normal flow direction is established. The spacing between the location where the bypass steam is drawn off and returned to pipe 11 should be kept to a minimum to keep thermal stresses low.

High pressure inlet nozzle 19 and all surfaces exposed to high velocity particulate should be made of hard material such as stellite to minimize erosion Preferably, nozzle 19 should be a separate piece inserted into a carefully machined opening in wall 27 of separator cavity 15A. It should be tightly located to insure against motion or leakage. The nozzle area should be selected to provide good velocity for separation. For high pressure inlet nozzle 19, an area of about 10% of the steam pipe 11 might be considered. For reheat bypass systems, the nozzle area could be approximately 20% of the steam pipe 11 area.

Flow straightener 29 must be firmly secured to prevent vibration or motion. The lower edges of vertical plates 13 near the entrance to steam discharge pipe 20 should be tapered as shown at 14 to minimize interference with the steam flow to the steam discharge pipe.

The flow area of by-pass pipe 8 and steam discharge pipe 20 should be sized for reasonable pressure drop. It is suggested that these pipes have flow areas of about four times that of nozzle 19, although a wide range of velocities can be considered.

It will, of course, be appropriate to consider other flow areas than those suggested above, depending on actual applications encountered.

Figure 4:
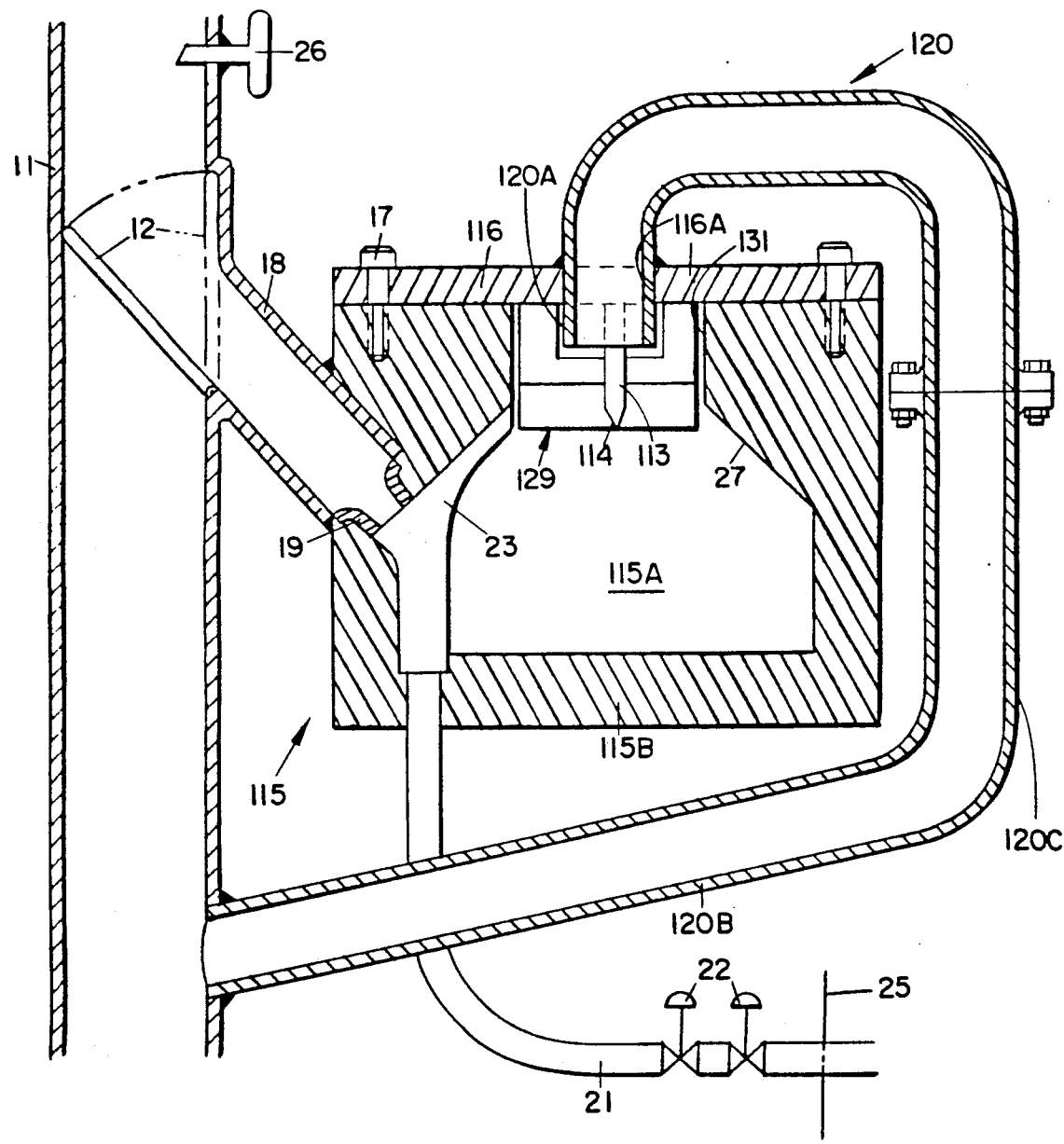
FIG. 4 is a side elevational view, partly in cross section, of a modified form of particulate separator having a top exit for steam leaving the separator.

In the form of the invention as seen in FIG. 4, a separator 115 has been modified to permit the exit of cleaned steam from the top of the separator, rather than from the bottom.

In this instance the major portion of a steam discharge pipe 120 is disposed exteriorly of the separator, there being only an upper inlet portion 120A which passes through a central opening 116A in a top access flange 116 of the separator to communicate with an upper central opening 131 of a separator cavity 115A immediately above a flow straightener 129 having crossed vertical plates 113 with both plates 113 tapering to a thin inlet edge 114 at the entrance.

Upper inlet portion 20A of the discharge pipe extends upwardly and outwardly from access flange 116 and includes an intermediate portion 120C which merges with an inclined lower portion 120B, which joins with steam pipe 11, as in the FIG. 1 embodiment.

Of course, in this embodiment, it is not necessary to provide an opening in a lower wall 115B of separator 115, since the discharge pipe does not pass therethrough.

Separator 115 of FIG. 4 is otherwise identical to separator 15 of FIG. 1.

In the embodiment of FIG. 6, a modified separator 215 includes a nozzle 219 of rectangular shape rather than the round configuration of nozzle 19 of FIGS. 1 and 4 for admitting steam into the separator.

Herein, nozzle 219 is a continuation of a bypass line 218 and leads into a cavity 215A of the separator. A scoop 223 also communicates with cavity 215A and leads to a hole 224 similar to hole 24 of FIG. 1.

As with the FIG. 4 embodiment, clean steam exits through the top of separator 215 past plates 213 of a flow straightener and into a steam discharge pipe 220.

The centrifugal separator affords a system for decreasing the losses and damage caused by particle entrance into steam turbines.

Numerous modifications and adaptations will be apparent to those of skill in the art.

I claim:

1. Start-up particulate separating apparatus for the inlet steam flow to a steam turbine comprising: a steam inlet pipe to the turbine, a centrifugal separator, means for directing the inlet steam from the inlet pipe to the separator, an inlet nozzle in the separator for accelerating the steam to a high centrifugal velocity, collection means in the separator for capturing centrifugal particulate material, a dump steam line leading from the collection means to a condenser or other location for discharging a combination of a small steam flow and the collected particulate material from the separator, a steam discharge pipe for cleaned steam to redirect the flow from the separator back to the turbine inlet pipe; and valve means for closing off the fow to the centrifugal separator whenever conditions indicate that particulate material is not a problem and for simultaneously opening the normal fow path of admission steam through the steam inlet pipe to the turbine.

2. Start-up particulate separating apparatus as set forth in claim 1 including; a flow straightener in the particulate separator to eliminate or reduce the whirl of steam approaching the steam discharge pipe.

3. Start-up particulate separating apparatus as set forth in claim 2, wherein the flow straightener in the centrifugal separator includes a pair of vertical plates disposed at 90° angles relative to each other.

4. Start-up particulate separating apparatus as set forth in claim 1, wherein the steam discharge pipe for cleaned steam exits from the bottom of the centrifugal separator.

5. Start-up particulate separating apparatus as set forth in claim 1, wherein the steam discharge pipe for cleaned steam exists from the top of the centrifugal separator.

6. Start-up particulate separating apparatus as set forth in claim 1, wherein the inlet nozzle is annular.

7. Start-up particulate separating apparatus a set forth in claim 1, wherein the inlet nozzle is rectangular.

8. Start-up particulate separating apparatus as set forth in claim 1, wherein the valve means for closing off flow to the centrifugal separator is a two-way flapper valve in the steam inlet pipe.

9. Start-up particulate separating apparatus as set forth in claim 1, wherein the valve means for closing off the flow to the centrifugal separator comprises a pair of valves, one disposed in the steam inet pipe and one disposed between the inet pipe and the separator.

10. Start-up particulate separating apparatus as set forth in claim 1, wherein the collection means in the separator is a scoop having a circumferential tilt.

11. Start-up particulate separating apparatus as set forth in claim 1, including a particulate counter in the steam inlet pipe to determine the presence of particulate in the steam and to provide an operating signal to suggest whether the separator is needed.

* * * * *